(12) United States Patent
Tu et al.

(10) Patent No.: US 12,182,988 B2
(45) Date of Patent: Dec. 31, 2024

(54) COATING SIZE CORRECTION METHOD AND APPARATUS, DEVICE, STORAGE MEDIUM, AND PROGRAM PRODUCT

(71) Applicant: CONTEMPORARY AMPEREX TECHNOLOGY (HONG KONG) LIMITED, Hong Kong (CN)

(72) Inventors: Yinhang Tu, Ningde (CN); Yunfei Ma, Ningde (CN); Shichuang Song, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/662,142

(22) Filed: May 13, 2024

(65) Prior Publication Data
US 2024/0296542 A1  Sep. 5, 2024

Related U.S. Application Data

(63) Continuation of application No. PCT/CN2022/103124, filed on Jun. 30, 2022.

(51) Int. Cl.
*G06T 7/00* (2017.01)
*B05B 12/08* (2006.01)
(Continued)

(52) U.S. Cl.
CPC .......... *G06T 7/0006* (2013.01); *B05B 12/084* (2013.01); *G06T 7/001* (2013.01);
(Continued)

(58) Field of Classification Search
CPC .......... G06T 7/0006; G06T 7/001; G06T 2207/30108; B05B 12/084; H01M 4/0404; H01M 4/0419; H01M 4/139; B05C 11/00
See application file for complete search history.

(56) References Cited

FOREIGN PATENT DOCUMENTS

| CN | 102449430 A | * | 5/2012 |
| CN | 212441883 U | | 2/2021 |

(Continued)

OTHER PUBLICATIONS

International Search Report dated Jan. 3, 2023 for Application No. PCT /CN2022/103124.
(Continued)

*Primary Examiner* — Samir A Ahmed
(74) *Attorney, Agent, or Firm* — Ladas & Parry LLP

(57) ABSTRACT

A coating size correction method and apparatus, an device, storage medium, and a program product are disclosed The method includes: acquiring a first wet coating width and a first dry coating width of a first coating region on an electrode plate; calculating a first deviation between the first dry coating width and a preset coating width, and a second deviation between the first wet coating width and the first dry coating width; and determining a first correction amount based on the first deviation and the second deviation. In this application, the first correction amount for correcting the deviation is determined based on the first wet coating width and first dry coating width acquired at the same position and based on the preset coating width, thereby improving efficiency and accuracy of coating size correction.

18 Claims, 5 Drawing Sheets

(51) Int. Cl.
  *H01M 4/04*     (2006.01)
  *H01M 4/139*    (2010.01)

(52) U.S. Cl.
  CPC ....... *H01M 4/0404* (2013.01); *H01M 4/0419* (2013.01); *H01M 4/139* (2013.01); *G06T 2207/30108* (2013.01)

(56) References Cited

FOREIGN PATENT DOCUMENTS

| | | | |
|---|---|---|---|
| CN | 112916327 | A | 6/2021 |
| CN | 113390879 | A | 9/2021 |
| CN | 216296957 | U | 4/2022 |
| JP | 2003047900 | A | 2/2003 |
| JP | 2014226634 | A | 12/2014 |
| WO | WO 2010135769 | A1 * | 12/2010 |
| WO | WO 2010135770 | A1 * | 12/2010 |

OTHER PUBLICATIONS

Written Opinion dated Jan. 3, 2023 for Application No. PCT/CN2022/103124.

* cited by examiner

COATING SIZE CORRECTION METHOD AND APPARATUS, DEVICE, STORAGE MEDIUM, AND PROGRAM PRODUCT

CROSS REFERENCE TO RELATED APPLICATIONS

This application is a continuation of International application PCT/CN2022/103124 filed on Jun. 30, 2022, the subject matter of which is incorporated herein in its entirety.

TECHNICAL FIELD

This application relates to the technical field of battery manufacturing, and in particular, to a coating size correction method and apparatus, a device, a storage medium, and a program product.

BACKGROUND

As an operation in a battery production process, coating is a process of coating a previously prepared slurry onto a current collector (such as aluminum foil or copper foil) uniformly by a specified thickness and drying a solvent.

In a coating shop floor for batteries, the control and adjustment of the coating size are one of the important steps to ensure good quality of products output in the coating process. If the coating size is not controlled accurately, the safety performance of the batteries will be impaired. Currently, the coating production process mainly relies on manual measurement of a dry coating size to determine whether the dry coating size meets requirements, thereby being of low precision and low efficiency in size correction.

SUMMARY

An objective of some embodiments of this application is to provide a coating size correction method and apparatus, a device, a storage medium, and a program product to improve efficiency and accuracy of coating size correction.

According to a first aspect, an embodiment of this application provides a coating size correction method, including: acquiring, by a correction apparatus, a first wet coating width and a first dry coating width of a first coating region on an electrode plate; calculating a first deviation between the first dry coating width and a preset coating width, and a second deviation between the first wet coating width and the first dry coating width; and determining a first correction amount based on the first deviation and the second deviation.

In this embodiment of this application, the first correction amount for correcting the deviation is determined based on the first wet coating width and first dry coating width acquired by the correction apparatus and based on the preset coating width, thereby improving efficiency and accuracy of coating size correction.

In an embodiment, the method specifically includes: obtaining the first deviation between the first dry coating width and the preset coating width as well as the second deviation between the first wet coating width and the first dry coating width when the first dry coating width fails to meet a preset requirement.

In this embodiment of this application, before calculating the first deviation and the second deviation, the method first determines whether the first dry coating width meets the preset requirement, and then calculates the first deviation and the second deviation when the first dry coating width fails to meet the preset requirement, thereby reducing the amount of calculation.

In an embodiment, the first correction amount may be calculated by the following steps:
determining the first correction amount based on the first deviation when the first deviation indicates that the first dry coating width is greater than the preset coating width, and when the second deviation indicates that the first wet coating width is greater than the first dry coating width; and
determining the first correction amount based on an absolute value of the first deviation and an absolute value of the second deviation when the first deviation indicates that the first dry coating width is greater than the preset coating width, and when the second deviation indicates that the first wet coating width is less than the first dry coating width.

In this embodiment of this application, by comparing the first dry coating width with the preset coating width, it is determined whether the first dry coating width needs to be widened or narrowed. The expansibility or shrinkability of the coating is determined based on the first wet coating width and the first dry coating width, and then the first correction amount is determined accurately based on the above determining result.

In an embodiment, the method specifically includes:
determining the first correction amount based on the first deviation when the first deviation indicates that the first dry coating width is less than the preset coating width, and when the second deviation indicates that the first wet coating width is less than the first dry coating width; and
determining the first correction amount based on an absolute value of the first deviation and an absolute value of the second deviation when the first deviation indicates that the first dry coating width is less than the preset coating width, and when the second deviation indicates that the first wet coating width is greater than the first dry coating width.

In this embodiment of this application, by comparing the first dry coating width with the preset coating width, it is determined whether the first dry coating width needs to be widened or narrowed. The expansibility or shrinkability of the coating is determined based on the first wet coating width and the first dry coating width, and then the first correction amount is determined accurately based on the above determining result.

In an embodiment, the determining the first correction amount based on an absolute value of the first deviation and an absolute value of the second deviation includes:
determining the first correction amount based on the first deviation when a difference between the absolute value of the first deviation and the absolute value of the second deviation is greater than zero; or
determining the first correction amount based on the second deviation when a difference between the absolute value of the first deviation and the absolute value of the second deviation is less than zero.

In this embodiment of this application, a main factor for the first dry coating width failing to meet the requirement is determined by calculating the absolute value of the first deviation versus the absolute value of the second deviation, and then the first correction amount is determined based on the main factor, thereby improving the accuracy of calculating the first correction amount.

In an embodiment, after determining the first correction amount, the method further includes: controlling, based on the first correction amount when the first dry coating width is greater than the preset coating width, a spraying apparatus to move away from the electrode plate along a thickness direction of the electrode plate; or, controlling, based on the first correction amount when the first dry coating width is less than the preset coating width, a spraying apparatus to move toward the electrode plate along a thickness direction of the electrode plate.

In this embodiment of this application, the position of the spraying apparatus is adjusted correspondingly based on the comparison between the first dry coating width and the preset coating width, and the efficiency and accuracy of adjusting the coating size are improved by automatically adjusting the spraying apparatus.

In an embodiment, the acquiring a first wet coating width and a first dry coating width of a first coating region on an electrode plate includes: acquiring a first wet coating image and a first dry coating image of the first coating region on the electrode plate by use of an image acquisition apparatus; and determining, based on a device parameter of the image acquisition apparatus, the first wet coating width corresponding to the first wet coating image and the first dry coating width corresponding to the first dry coating image.

In this embodiment of this application, the first wet coating width and the first dry coating width can be determined efficiently and accurately by using vision technology.

In an embodiment, the acquiring a first wet coating width and a first dry coating width of a first coating region on an electrode plate includes: obtaining a first wet coating of a first preset length in the first coating region on the electrode plate, and using an average width of the first wet coating of the first preset length as the first wet coating width; and obtaining a first dry coating of a second preset length, and using an average width of the first dry coating of the second preset length as the first dry coating width.

In this embodiment of this application, an average width across a coating length in the coating region is adopted so as to more accurately reflect the first wet coating width and the first dry coating width.

In an embodiment, the method further includes: acquiring a second wet coating width and a second dry coating width of a second coating region on the electrode plate, where the second coating region and the first coating region are arranged in parallel in a length direction of the electrode plate; calculating a third deviation between the second dry coating width and a preset coating width as well as a fourth deviation between the second wet coating width and the second dry coating width when the second dry coating width fails to meet a preset width requirement; and determining a second correction amount based on the third deviation and the fourth deviation.

This embodiment of this application is applicable to a one-into-two coating process, and implements correction for the dimensions of both the first coating region and the second coating region concurrently, thereby improving the efficiency of deviation correction.

In an embodiment, the determining a second correction amount based on the third deviation and the fourth deviation includes:

determining the second correction amount based on the third deviation when the third deviation indicates that the second dry coating width is greater than the preset coating width, and when the fourth deviation indicates that the second wet coating width is greater than the second dry coating width; and determining the second correction amount based on an absolute value of the third deviation and an absolute value of the fourth deviation when the third deviation indicates that the second dry coating width is greater than the preset coating width, and when the fourth deviation indicates that the second wet coating width is less than the second dry coating width.

In this embodiment of this application, by comparing the second dry coating width with the preset coating width, it is determined whether the second dry coating width needs to be widened or narrowed. The expansibility or shrinkability of the coating is determined based on the second wet coating width and the second dry coating width, and then the second correction amount is determined accurately based on the above determining result.

In an embodiment, the determining a second correction amount based on the third deviation and the fourth deviation includes:

determining the second correction amount based on the third deviation when the third deviation indicates that the second dry coating width is less than the preset coating width, and when the fourth deviation indicates that the second wet coating width is less than the second dry coating width; and determining the second correction amount based on an absolute value of the third deviation and an absolute value of the fourth deviation when the third deviation indicates that the second dry coating width is less than the preset coating width, and when the fourth deviation indicates that the second wet coating width is greater than the second dry coating width.

In this embodiment of this application, by comparing the second dry coating width with the preset coating width, it is determined whether the second dry coating width needs to be widened or narrowed. The expansibility or shrinkability of the coating is determined based on the second wet coating width and the second dry coating width, and then the second correction amount is determined accurately based on the above determining result.

In an embodiment, the determining the second correction amount based on an absolute value of the third deviation and an absolute value of the fourth deviation includes:

determining the second correction amount based on the third deviation when a difference between the absolute value of the third deviation and the absolute value of the fourth deviation is greater than zero; or determining the second correction amount based on the fourth deviation when a difference between the absolute value of the third deviation and the absolute value of the fourth deviation is less than zero.

In this embodiment of this application, a main factor for the second dry coating width failing to meet the requirement is determined by calculating the absolute value of the third deviation versus the absolute value of the fourth deviation, and then the second correction amount is determined based on the main factor, thereby improving the accuracy of calculating the second correction amount.

In an embodiment, after obtaining the first correction amount and the second correction amount, the method further includes:

controlling, based on the first deviation and the first correction amount, a first end of a spraying apparatus to move along a thickness direction of the electrode plate; and controlling, based on the third deviation and the second correction amount, a second end of the spraying apparatus to move along the thickness direction of the electrode plate. The first end is an end of the spraying apparatus and opposite to the first coating region, and the second end is an end of the spraying apparatus and opposite to the second coating region.

In this embodiment of this application, the forward movement distance and the backward movement distance of the two ends of the spraying apparatus can be adjusted based on the first correction amount and the second correction amount respectively, thereby adjusting the size of a single coating region among a plurality of coating regions in the electrode plate.

In an embodiment, the acquiring a second wet coating width and a second dry coating width of a second coating region on an electrode plate includes: acquiring a second wet coating image and a second dry coating image of the second coating region on the electrode plate by use of an image acquisition apparatus; and determining, based on a device parameter of the image acquisition apparatus, the second wet coating width corresponding to the second wet coating image and the second dry coating width corresponding to the second dry coating image.

In this embodiment of this application, the second wet coating width and the second dry coating width can be determined efficiently and accurately by using vision technology.

In an embodiment, the acquiring a second wet coating width and a second dry coating width of a second coating region on an electrode plate includes: obtaining a second wet coating of a third preset length in the second coating region on the electrode plate, and using an average width of the second wet coating of the third preset length as the second wet coating width; and obtaining a second dry coating of a fourth preset length, and using an average width of the second dry coating of the fourth preset length as the second dry coating width.

In this embodiment of this application, an average width across a coating length in the coating region is adopted so as to more accurately reflect the second wet coating width and the second dry coating width.

In a second aspect, an embodiment of this application provides a coating size correction apparatus, including: a width obtaining module, a deviation calculation module, and a correction module.

The width obtaining module is configured to acquire a first wet coating width and a first dry coating width of a first coating region on an electrode plate. The deviation calculation module is configured to calculate a first deviation between the first dry coating width and a preset coating width, and a second deviation between the first wet coating width and the first dry coating width. The correction module is configured to determine a first correction amount based on the first deviation and the second deviation.

In a third aspect, an embodiment of this application provides an electronic device, including: a processor, a memory, and a bus. The processor communicates with the memory through the bus. The memory stores a program instruction executable by the processor. The processor calls the program instruction to perform the method according to the first aspect.

According to a fourth aspect, an embodiment of this application provides a non-transitory computer-readable storage medium. The non-transitory computer-readable storage medium stores a computer instruction, and the computer instruction causes a computer to perform the method according to the first aspect.

In a fifth aspect, an embodiment of this application provides a coating size correction system, including: an image acquisition apparatus and a coating size correction apparatus.

The image acquisition apparatus is communicatively connected to the coating size correction apparatus, and is configured to acquire image data of an electrode plate coated by a piece of coating equipment, and send the image data to the coating size correction apparatus. The coating size correction apparatus is configured to perform, based on the image data, the method according to the first aspect.

On the basis of the above embodiment, the image acquisition apparatus includes a first image acquirer, a second image acquirer, a third image acquirer, and a fourth image acquirer. The first image acquirer is disposed on a first side of an oven in the coating equipment, oriented directly toward a first surface of the electrode plate, and configured to acquire a wet coating image of the first surface. The second image acquirer is disposed on a second side of the oven, oriented directly toward the first surface of the electrode plate, and configured to acquire a dry coating image of the first surface. The third image acquirer is disposed on a second side of the oven in the coating equipment, oriented directly toward a second surface of the electrode plate, and configured to acquire a wet coating image of the second surface. The fourth image acquirer is disposed on the first side of the oven, oriented directly toward the second surface of the electrode plate, and configured to acquire a dry coating image of the second surface.

Other features and advantages of this application are expounded in the following specification and partly become evident from the specification, or will be understood by implementing an embodiment of this application. The objectives and other advantages of this application can be implemented and achieved through the structures specified in the specification, the claims, and the drawings.

BRIEF DESCRIPTION OF DRAWINGS

To describe technical solutions in embodiments of this application more clearly, the following outlines the drawings to be used in the embodiments of this application. Understandably, the following drawings show merely some embodiments of this application, and therefore, are not intended to limit the scope. A person of ordinary skill in the art may derive other related drawings from the drawings without making any creative efforts.

DETAILED DESCRIPTION

Figure 1:
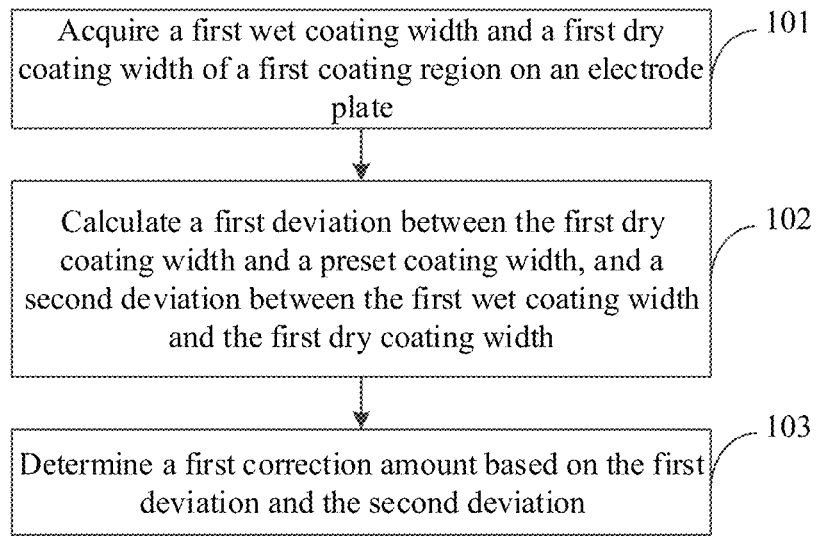
FIG. 1 is a schematic flowchart of a coating size correction method according to an embodiment of this application.

Some embodiments of the technical solutions of this application are described in detail below with reference to the drawings. The following embodiments are merely intended as examples to describe the technical solutions of this application more clearly, but not intended to limit the protection scope of this application.

Unless otherwise defined, all technical and scientific terms used herein bear the same meanings as what is normally understood by a person skilled in the technical field of this application. The terms used herein are merely intended to describe specific embodiments but not to limit this application. The terms "include" and "contain" and any variations thereof used in the specification, claims, and brief description of drawings of this application are intended as non-exclusive inclusion.

In the description of the embodiments of this application, the technical terms "first" and "second" are merely intended to distinguish between different items but not intended to indicate or imply relative importance or implicitly specify the number of the indicated technical features, specific order, or order of precedence. In the description of the embodiments of this application, unless otherwise expressly specified, "a plurality of" means two or more.

Reference to an "embodiment" herein means that a specific feature, structure or characteristic described with reference to this embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described herein may be combined with other embodiments.

In the description of embodiments of this application, the term "and/or" merely indicates a relationship between related items, and represents three possible relationships. For example, "A and/or B" may represent the following three circumstances: A alone, both A and B, and B alone. In addition, the character "/" herein generally indicates an "or" relationship between the item preceding the character and the item following the character.

In the description of embodiments of this application, the term "a plurality of" means two or more (including two). Similarly, "a plurality of groups" means two or more groups (including two groups), and "a plurality of pieces" means two or more pieces (including two pieces).

In the description of embodiments of this application, a direction or a positional relationship indicated by the terms such as "center", "longitudinal", "transverse", "length", "width", "thickness", "up", "down", "before", "after", "left", "right", "vertical", "horizontal", "top", "bottom", "in", "out", "clockwise", "counterclockwise", "axial", "radial", and "circumferential" is a direction or positional relationship based on the illustration in the drawings, and is merely intended for ease or brevity of description of embodiments of this application, but not intended to indicate or imply that the indicated device or component is necessarily located in the specified direction or constructed or operated in the specified direction. Therefore, such terms are not to be understood as a limitation on embodiments of this application.

In the description of the embodiments of this application, unless otherwise expressly specified and defined, the technical terms such as "mounting", "concatenation", "connection", and "fixing" need to be understood in a broad sense, for example, understood as a fixed connection or a detachable connection or integrally formed; or understood as a mechanical connection or an electrical connection; understood as a direct connection, or an indirect connection implemented through an intermediary; or understood as internal communication between two components or interaction between two components. A person of ordinary skill in the art can understand the specific meanings of the terms in the embodiments of this application according to specific situations.

Applying or coating slurry is a step next to preparation of the slurry. An important purpose of the slurry coating is to evenly coat a positive or negative current collector (also known as electrode plate substrate) with the slurry of high stability, high viscosity, and high fluidity. Electrode plate coating is of great significance to a lithium-ion battery, and the significance is mainly reflected in the following aspects:

1. The electrode plate coating is of great significance to the capacity of a finished battery. During the coating, if the thickness of the positive or negative slurry coating layer is inconsistent between a front section, a middle section, and a rear section of the electrode plate, the capacity of the battery is prone to be overly low or overly high. Even worse, lithium plating occurs during cycling of the battery and impairs the lifespan of the battery.
2. The electrode plate coating is of great significance to safety of the battery. The 5S work needs to well done before the slurry is applied, so as to prevent particles, debris, dust, and the like from entering the electrode plate in the coating process. The debris brought in will cause a micro-short-circuit inside the battery, and even worse, result in fire and explosion of the battery.
3. The electrode plate coating is of great significance to performance consistency of the battery. What a battery factory hates most is that the capacity and cycle life differ sharply among a batch of batteries. Therefore, it is necessary to ensure that the parameters of the electrode plate are consistent before and after the electrode plate is coated.
4. The electrode plate coating is of great significance to the lifespan of the battery. The electrochemical performance of the battery will be impaired if the parameters differ sharply before and after slurry coating, dust is brought into the electrode plate, the thickness of the electrode plate is uneven between a left section and a right section, or the like.

Extrusion coating is one of coating methods, and is based on the following working principles: A feeding system conveys the slurry to a screw pump, and then dynamically conveys the slurry to an extrusion head. The slurry is formed into a liquid film by extrusion, and then applied onto a moving current collector. After being dried, the slurry forms a uniform coating layer.

Currently, the control and adjustment of the coating size in a coating process are one of the important steps to ensure good quality of products output in this process. For a lithium battery, if the coating size is not controlled accurately, a phenomenon of lithium plating will occur in the lithium battery and impair the safety performance of the battery. To ensure that the coating size meets the requirements, the dry coating size may be manually measured, and the measured dry coating size is compared with a preset coating size to determine whether the dry coating size meets the requirements. If the dry coating size fails to meet the requirements, a spraying apparatus needs to be adjusted manually to adjust the wet coating size, thereby implementing the adjustment of the dry coating size. Understandably, both the dry coating size and the wet coating size mean the size of a coating region of an electrode plate substrate in the width direction.

The applicant hereof has noticed that, depending on the material of the slurry, the size of the dry coating region generated by drying the wet coating region varies from the size of the wet coating region to different degrees. In other words, the size of the dried coating region is larger than the size measured before drying, or, the size of the dried coating region is smaller than the size measured before drying. After the dry coating size is measured, the operator just adjusts the spraying apparatus manually based on the deviation between the dry coating size and the preset coating size, thereby leading to a problem of inaccurate adjustment.

To solve the above technical problem, the applicant hereof puts forward a coating size correction method and apparatus, a device, a storage medium, and a program product. The method includes: acquiring a first wet coating width and a first dry coating width; calculating a first deviation between the first dry coating width and a preset coating width, and a second deviation between the first wet coating width and the first dry coating width; and determining a first correction amount based on the first deviation and the second deviation.

Through the above technical solution, the first correction amount is determined by comprehensively considering the change in size of the first coating region from a wet state to a dry state, as well as the first dry coating width and the preset coating width, thereby improving the accuracy of determining the first correction amount.

The coating size correction method according to an embodiment of this application is not only applicable to correction of the coating size in a coating process during production of a lithium battery, but also applicable to correction of the coating size of other types of batteries subjected to a coating process.

FIG. 1 is a schematic flowchart of a coating size correction method according to an embodiment of this application. As shown in FIG. 1, the coating size correction method according to this embodiment of this application is applicable to an electronic device. The electronic device includes a terminal and a server. Specifically, the terminal may be a smartphone, a tablet computer, a computer, a personal digital assistant (PDA), and the like, and the server may be an application server or a web server.

The method includes the following steps:

Step 101: Acquire a first wet coating width and a first dry coating width of a first coating region on an electrode plate;

Step 102: Calculate a first deviation between the first dry coating width and a preset coating width, and a second deviation between the first wet coating width and the first dry coating width; and Step 103: Determine a first correction amount based on the first deviation and the second deviation.

Figure 2:
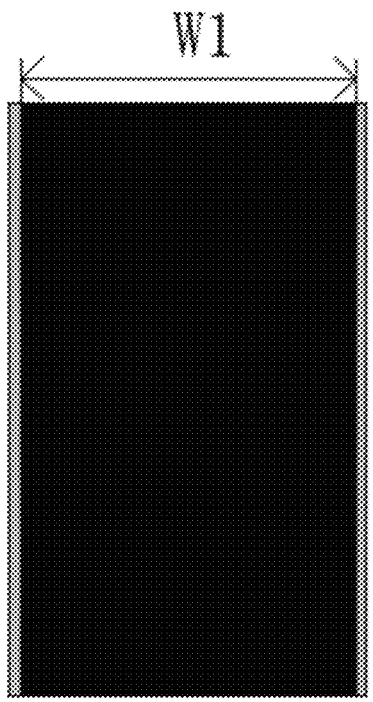
FIG. 2 is a schematic diagram of an electrode plate containing one coating region according to an embodiment of this application.

In step 101, the electrode plate includes a positive electrode plate and a negative electrode plate. The positive electrode plate is formed by combining a positive active material with a current collector. The negative electrode plate is formed by combining a negative active material with a current collector. Specifically, the positive active material or the negative active material is coated on the current collector to form a corresponding positive electrode plate or negative electrode plate. The first coating region means a region formed by applying the positive active material or the negative active material onto the current collector. As shown in FIG. 2, the black region is the first coating region, and W1 is a coating width of the first coating region. Understandably, if the first coating region is the first wet coating region, then W1 is used for representing the first wet coating width. If the first coating region is the first dry coating region, then W1 is used for representing the first dry coating width. Therefore, the first wet coating width and the first dry coating width mean a width of the coating region in the width direction of the electrode plate substrate. Understandably, the first wet coating width and the first dry coating width may be obtained through visual technology or by other means. The meaning of obtaining the coating width is not particularly limited in this embodiment of this application.

The first wet coating width and the first dry coating width may be widths at the same position of the first coating region. The same position may be understood as being in the same zone in the first coating region. For example, the first wet coating width is an average width of a zone at the $1^{st}$ meter to the $2^{nd}$ meter in the first coating region in the length direction. Therefore, the first dry coating width is also the average width of the zone at the $1^{st}$ meter to the $2^{nd}$ meter in the first coating region. Understandably, the purpose of defining the first wet coating width and the first dry coating width at the same position in this embodiment of this application is to calculate and obtain the change in the width of the same zone changing from a wet state to a dry state in a subsequent step. Definitely, the first coating region corresponding to the first wet coating width may slightly deviate from, but not necessarily exactly identical to, the first coating region corresponding to the first dry coating width. For example, the first wet coating width is an average width of a zone at the $1^{st}$ meter to the $2^{nd}$ meter in the first coating region in the length direction, and therefore, the first dry coating width is the average width of the zone at the $0.9^{th}$ meter to the $1.9^{th}$ meter in the first coating region. Alternatively, the first wet coating width and the first dry coating width may represent a width corresponding to a specified position in the first coating region. For example, the first wet coating width and the first dry coating width may be a width at the $1^{st}$ meter in the first coating region. For another example, the first wet coating width may be a width at the $1^{st}$ meter in the first coating region before drying, and the first dry coating width may be a width at the $1.1^{st}$ meter in the first coating region after drying.

Understandably, the electronic device may acquire the first wet coating width and the first dry coating width through a coating size measurement apparatus carried on the electronic device, or may receive the first wet coating width and the first dry coating width sent by an external coating size measurement apparatus. The acquisition manner is not particularly limited in this application.

In step 102, the coating size required for preparing different models of batteries is different. Therefore, the preset width requirement is preset depending on the actual coating process. The purpose of this embodiment of this application is to produce a coating size that meets the process requirements. An optimal result is to make the first dry coating width equal to the preset coating width. However, due to factors such as machine errors, environmental impact, or coating materials during the coating, the first dry coating width may deviate from the preset coating width. Therefore, after acquiring the first dry coating width, the electronic device calculates a first deviation between the first dry coating width and the preset coating width, and a second deviation between the first wet coating width and the first dry coating width. The first deviation may be obtained by subtracting the preset coating width from the first dry coating width, or obtained by subtracting the first dry coating width from the preset coating width. The second deviation may be obtained by subtracting the first dry coating width from the first wet coating width, or obtained by subtracting the first wet coating width from the first dry coating width. It is hereby noted that the specific method for obtaining the first deviation and the second deviation will affect the subsequent steps. This embodiment of this application is described by using an example in which the first deviation is obtained by subtracting the preset coating width from the first dry coating width, and in which the second deviation is obtained by subtracting the first dry coating width from the first wet coating width.

In step 103, the first correction amount is used for representing the amount by which the position of the spraying apparatus is adjusted. The first correction amount may be a specific distance by which the spraying apparatus needs to be adjusted along the thickness direction of the electrode plate, or may be the number of times the position of the spraying apparatus needs to be adjusted. Understandably, each time the spraying apparatus is adjusted, the distance by which the spraying apparatus is adjusted along the thickness direction of the electrode plate is fixed. Therefore, the number of times the position of the spraying apparatus needs to be adjusted is positively correlated to the distance by which the spraying apparatus moves in the thickness direction of the electrode plate. After obtaining the first deviation and the second deviation, the electronic device may determine, based on the first deviation and the second deviation, the first correction amount by which the position of the spraying apparatus needs to be adjusted.

In this embodiment of this application, the first correction amount for correcting the deviation is determined based on the first wet coating width and first dry coating width acquired by the correction apparatus and based on the preset coating width, thereby improving efficiency and accuracy of coating size correction.

On the basis of the above embodiment, before calculating the first deviation and the second deviation, the electronic device may determine whether the first dry coating width meets a preset requirement. If the first dry coating width fails to meet the preset requirement, it indicates that the first wet coating width needs to be adjusted. In this case, the electronic device calculates and obtains the first deviation between the first dry coating width and the preset coating width as well as the second deviation between the first wet coating width and the first dry coating width.

In a specific implementation process, in a practical production process, a small deviation between the first dry coating width and the preset coating width is allowed. For example, if the deviation falls within (−0.5 mm, 0.5 mm), it indicates that the first dry coating width meets the preset requirement. In this case, the first wet coating width does not need to be adjusted. If the deviation falls outside the above range, it indicates that the first dry coating width fails to meet the preset requirement. In this case, the first wet coating width needs to be adjusted. It is hereby noted that ±0.5 mm is an example of the range in this embodiment of this application. The specific value may be set according to the actual situation, and the deviation range is not particularly limited in this embodiment of this application.

Therefore, to reduce the calculation amount of the electronic device, if the electronic device determines, after acquiring the first dry coating width, that the first dry coating width fails to meet the preset requirement, then the electronic device obtains a first deviation between the first dry coating width and the preset coating width, and a second deviation between the first wet coating width and the first dry coating width.

In this embodiment of this application, after determining that the first dry coating width fails to meet the preset requirement, the electronic device calculates the first deviation and the second deviation, thereby reducing the calculation amount of the electronic device.

On the basis of the above embodiment, the electronic device may determine the first correction amount based on the first deviation and the second deviation by performing the following steps:
  determining the first correction amount based on the first deviation when the first deviation between the first dry coating width and the preset coating width indicates that the first dry coating width is greater than the preset coating width, and when the second deviation between the first wet coating width and the first dry coating width indicates that the first wet coating width is greater than the first dry coating width; and
  determining the first correction amount based on the absolute value of the first deviation and the absolute value of the second deviation when the first deviation between the first dry coating width and the preset coating width indicates that the first dry coating width is greater than the preset coating width, and when the second deviation between the first wet coating width and the first dry coating width indicates that the first wet coating width is less than the first dry coating width.

In a specific implementation process, if the first deviation is greater than 0, it indicates that the first dry coating width is greater than the preset coating width, and it is preliminarily determined that the first wet coating width needs to be reduced. If the second deviation is greater than 0, it indicates that the first wet coating width is greater than the first dry coating width, and thereby indicates that the coating width of the first coating region becomes narrower after transition from a wet state to a dry state. If both the first deviation and the second deviation are greater than 0, it indicates that, compared with the first wet coating region, the first dry coating region with a width reduced by drying is still wider than the preset coating width. In this case, the first correction amount is determined based on the first deviation.

If the second deviation is less than 0, it indicates that the first dry coating width is greater than the first wet coating width, and thereby indicates that the coating width of the first coating region becomes wider after transition from a wet state to a dry state. If the first deviation is greater than 0 and the second deviation is less than 0, it indicates that, compared with the first wet coating region, the first dry coating region with a width increased by drying is wider than the preset coating width. In this case, it is necessary to determine, based on the absolute value of the first deviation and the absolute value of the second deviation, the main factor that causes the first dry coating width to be greater than the preset coating width (whether primarily lies in the width change of the coating region from a wet state to a dry state, or primarily lies in the deviation between the first dry coating width and the preset coating width), and then determine the first correction amount accordingly.

In this embodiment of this application, by comparing the first dry coating width with the preset coating width, it is determined whether the first dry coating width needs to be widened or narrowed. The expansibility or shrinkability of the coating is determined based on the first wet coating width and the first dry coating width, and then the first correction amount is determined accurately based on the above determining result.

On the basis of the above embodiment, when the electronic device determines the first correction amount based on the first deviation and the second deviation, the following operations may be performed in the following circumstances:

determining the first correction amount based on the first deviation when the first deviation between the first dry coating width and the preset coating width indicates that the first dry coating width is less than the preset coating width, and when the second deviation between the first wet coating width and the first dry coating width indicates that the first wet coating width is less than the first dry coating width; and determining the first correction amount based on the absolute value of the first deviation and the absolute value of the second deviation when the first deviation between the first dry coating width and the preset coating width indicates that the first dry coating width is less than the preset coating width, and when the second deviation between the first wet coating width and the first dry coating width indicates that the first wet coating width is greater than the first dry coating width.

In a specific implementation process, if the first deviation is less than 0, it indicates that the first dry coating width is less than the preset coating width, and it is preliminarily determined that the first wet coating width needs to be increased. If the second deviation is less than 0, it indicates that the first wet coating width is less than the first dry coating width, and thereby indicates that the coating width of the first coating region becomes wider after transition from a wet state to a dry state. If both the first deviation and the second deviation are less than 0, it indicates that, compared with the first wet coating region, the first dry coating region with a width increased by drying is still narrower than the preset coating width. In this case, the first correction amount is determined based on the first deviation.

If the second deviation is greater than 0, it indicates that the first dry coating width is less than the first wet coating width, and thereby indicates that the coating width of the first coating region becomes narrower after transition from a wet state to a dry state. If the first deviation is less than 0 and the second deviation is greater than 0, it indicates that, compared with the first wet coating region, the first dry coating region with a width reduced by drying is narrower than the preset coating width. In this case, it is necessary to determine, based on the absolute value of the first deviation and the absolute value of the second deviation, the main factor that causes the first dry coating width to be less than the preset coating width (whether primarily lies in the width change of the coating region from a wet state to a dry state, or primarily lies in the deviation between the first dry coating width and the preset coating width), and then determine the first correction amount accordingly.

In this embodiment of this application, by comparing the first dry coating width with the preset coating width, it is determined whether the first dry coating width needs to be widened or narrowed. The expansibility or shrinkability of the coating is determined based on the first wet coating width and the first dry coating width, and then the first correction amount is determined accurately based on the above determining result.

On the basis of the above embodiment, in a case that the first correction amount needs to be determined based on the absolute value of the first deviation and the absolute value of the second deviation, the determining method specifically includes the following step:

determining, by the electronic device, the first correction amount based on the first deviation when a difference between the absolute value of the first deviation and the absolute value of the second deviation is greater than zero; or determining, by the electronic device, the first correction amount based on the second deviation when a difference between the absolute value of the first deviation and the absolute value of the second deviation is less than zero.

In a specific implementation process, if the absolute value of the first deviation is greater than the absolute value of the second deviation, it indicates that the first deviation exerts a greater effect on the coating width. Therefore, the electronic device determines the first correction amount based on the first deviation.

If the absolute value of the first deviation is less than the absolute value of the second deviation, it indicates that the second deviation exerts a greater effect on the coating width. Therefore, the electronic device determines the first correction amount based on the second deviation.

Understandably, the first correction amount in this embodiment of this application is also used for representing the number of times the spraying apparatus needs to move. The calculation method of the first correction amount is similar to the method for calculating the first correction amount in the above embodiment, and is omitted here.

In this embodiment of this application, a main factor for the first dry coating width failing to meet the requirement is determined by calculating the absolute value of the first deviation versus the absolute value of the second deviation, and then the first correction amount is determined based on the main factor, thereby improving the accuracy of calculating the first correction amount.

On the basis of the above embodiment, after the first correction amount is determined, with respect to the relationship between the first dry coating width and the preset coating width, the position of the spraying apparatus may be adjusted by:

controlling, based on the first correction amount when the first dry coating width is greater than the preset coating width, a spraying apparatus to move away from the electrode plate along a thickness direction of the electrode plate; or controlling, based on the first correction amount when the first dry coating width is less than the preset coating width, a spraying apparatus to move toward the electrode plate along a thickness direction of the electrode plate.

In a specific implementation process, if the first dry coating width is greater than the preset coating width, it indicates that the first wet coating width needs to be reduced. Therefore, the electronic device controls the spraying apparatus to move away from the electrode plate along the thickness direction of the electrode plate by a distance equivalent to the first correction amount. If the first dry coating width is less than the preset coating width, it indicates that the first wet coating width needs to be increased. Therefore, the electronic device controls the spraying apparatus to move toward the electrode plate along the thickness direction of the electrode plate by a distance equivalent to the first correction amount.

In another embodiment, the electronic device acquires a first wet coating width and a first dry coating width of the first coating region on the electrode plate, calculates a first deviation between the first dry coating width and the preset coating width, and a second deviation between the first wet coating width and the first dry coating width, and then determines a first correction amount based on the first deviation and the second deviation. After determining the first correction amount, the electronic device determines whether the first dry coating width meets the preset width requirement. If the first dry coating width fails to meet the preset width requirement, the electronic device corrects the first wet coating width based on the first correction amount. If the first dry coating width meets the preset width requirement, the electronic device does not need to perform further processing.

In this embodiment of this application, the position of the spraying apparatus is adjusted correspondingly based on the comparison between the first dry coating width and the preset coating width, and the efficiency and accuracy of adjusting the coating size are improved by automatically adjusting the spraying apparatus.

On the basis of the above embodiment, the first wet coating width and the first dry coating width of the first coating region at the same position on an electrode plate may be acquired by:

acquiring a first wet coating image and a first dry coating image of the first coating region at the same position on the electrode plate by use of an image acquisition apparatus; and determining, based on a device parameter of the image acquisition apparatus, the first wet coating width corresponding to the first wet coating image and the first dry coating width corresponding to the first dry coating image.

In a specific implementation process, the image acquisition apparatus may be an apparatus configured to acquire an image and mounted on the electronic device, or may be an external apparatus configured to acquire an image, such as a CCD camera. If the image acquisition apparatus is an external apparatus, the image acquisition apparatus is communicatively connected to the electronic device, and sends the acquired first wet coating image and first dry coating image to the electronic device.

Depending on the type of the image acquisition apparatus, the device parameters vary. Correspondingly, after the image acquisition apparatus acquires an image, the actual width corresponding to each pixel in the image varies. Definitely, when the image acquisition apparatus acquires an image, the distance between the image acquisition apparatus and the target object also affects the actual width corresponding to one pixel. To accurately obtain the first wet coating width and the first dry coating width, this embodiment of this application may pre-calibrate the image acquisition apparatus. To be specific, the image acquisition apparatus performs image acquisition on an object of a known size in advance, so as to calibrate the actual width corresponding to a previous pixel in the acquired image. Subsequently, under the same working conditions, image acquisition is performed on the first coating region.

After obtaining the first wet coating image and the first dry coating image, the electronic device can determine the actual length corresponding to one pixel based on the device parameters of the image acquisition apparatus, and then obtain the first wet coating width based on the number of pixels occupied by the first wet coating region in the first wet coating image in the width direction, and obtain the first dry coating width based on the number of pixels occupied by the first dry coating region in the first dry coating image in the width direction.

Figure 3:
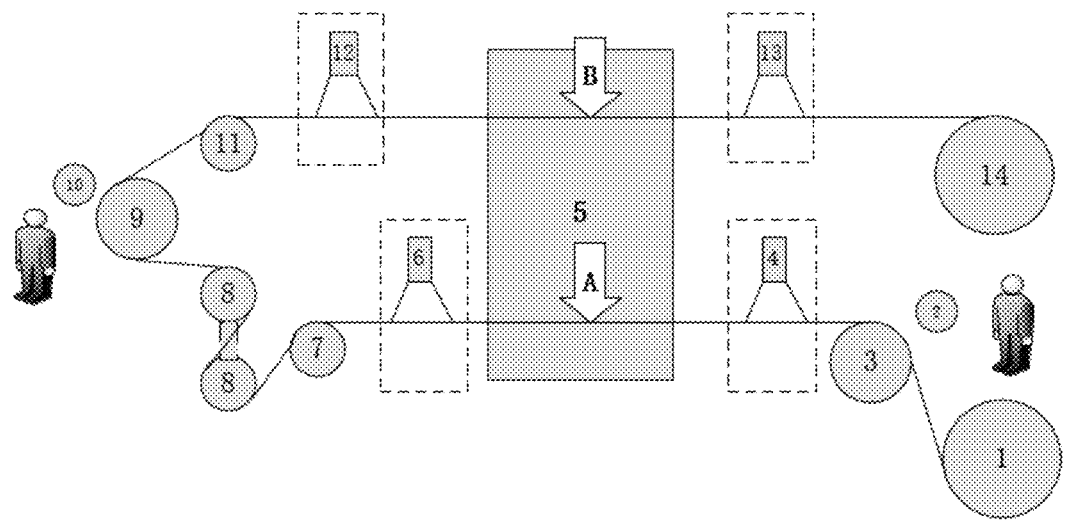
FIG. 3 is a schematic diagram of a coating machine measurement and spraying apparatus control system according to an embodiment of this application.

FIG. 3 is a schematic diagram of a coating machine measurement and spraying apparatus control system according to an embodiment of this application. As shown in FIG. 3, serial number 1 marks an unwinding mechanism configured to unwind the electrode plate substrate; and serial number 2 is an spraying apparatus on the surface A of the electrode plate, configured to spray an active material onto the surface A of the electrode plate. Serial number 3 is an active material spraying roller on the surface A of the electrode plate. Serial number 4 is a charge-coupled device (CCD) 1 for measuring the wet coating size on the surface A of the electrode plate, and is configured to acquire an image of the wet coating region on the surface A of the electrode plate, so as to obtain the corresponding wet coating width. Serial number 5 is an oven configured to dry the active material applied. Serial number 6 is a CCD 2 for measuring the dry coating size on the surface A of the electrode plate, and is configured to acquire an image of the dry coating region on the surface A of the electrode plate, so as to obtain the corresponding dry coating width. Serial number 7 is the substrate conveyance roller. Serial number 8 is a substrate realignment mechanism. Serial number 9 is an active material spraying roller on the surface B of the electrode plate. Serial number 10 is a spraying apparatus on the surface B of the electrode plate, that is, an active material spraying mechanism on the surface B of the electrode plate. Serial number 11 is a substrate conveyance roller of the electrode plate. Serial number 12 is a CCD 3 for measuring the wet coating size on the surface B of the electrode plate, and is configured to acquire an image of the wet coating region on the surface B of the electrode plate, so as to obtain the corresponding wet coating width. Serial number 13 is a CCD 4 for measuring the dry coating size on the surface B of the electrode plate, and is configured to acquire an image of the dry coating region on the surface B of the electrode plate, so as to obtain the corresponding dry coating width. Serial number 14 is a coating rewinding mechanism.

Understandably, FIG. 3 shows an apparatus for coating both sides of the electrode plate and correcting the coating width. If the coating width of just one surface of the electrode plate needs to be corrected, two CCDs numbered 4 and 6, or two CCDs numbered 12 and 13, may be used to acquire the coating width of the one surface of the electrode plate, and the corresponding spraying apparatus is adjusted.

In this embodiment of this application, the first wet coating width and the first dry coating width can be determined efficiently and accurately by using vision technology.

On the basis of the above embodiment, the first wet coating width and the first dry coating width of the first coating region on the electrode plate may be obtained by the following method:

obtaining a first wet coating of a first preset length in the first coating region on the electrode plate, and using an average width of the first wet coating of the preset length as the first wet coating width; and obtaining a first dry coating of a second preset length, and using an average width of the first dry coating of the second preset length as the first dry coating width.

In a specific implementation process, during the coating, the first wet coating width may be abruptly widened or narrowed in a short time due to the unstable operation of the coating machine, but at other times, the first wet coating width and the first dry coating width are stable and fall within the required normal width range. If only the abruptly changed first wet coating width and first dry coating width are acquired, the first wet coating width and the first dry coating width cannot be reflected accurately, and in turn, the first dry coating width that meets the requirements cannot be obtained by correcting the first wet coating width accurately.

To solve the above problem, the electronic device in an embodiment of this application uses an average width of the first wet coating of the preset length as the first wet coating width and uses an average width of the first dry coating of the first preset length as the first dry coating width. The preset length is set in advance. For example, the preset length may be 5 meters, 10 meters, 20 meters, or the like. The preset length is not particularly limited in this embodiment of this application.

During calculation of the average width of the first wet coating, measurement points may be set at intervals on the first wet coating, and the widths at the measurement points are measured. The widths of a plurality of measurement points may be obtained on the first wet coating, and summed and averaged out to obtain the first wet coating width.

Similarly, during calculation of the average width of the first dry coating, the first dry coating of a second preset length may be obtained. The first preset length may be the same as or different from the second preset length. The first dry coating and the first wet coating may be the first coating region at the same position on the electrode plate. On the first dry coating, a position corresponding to the measurement point on the first wet coating is used as a measurement point, and the width at this measurement point is measured. The widths of a plurality of measurement points may be obtained on the first dry coating, and summed and averaged out to obtain the first dry coating width.

Understandably, the length of each preset interval is less than the first preset length and the second preset length.

In this embodiment of this application, an average width across a coating length in the coating region is adopted so as to more accurately reflect the first wet coating width and the first dry coating width.

Figure 4:
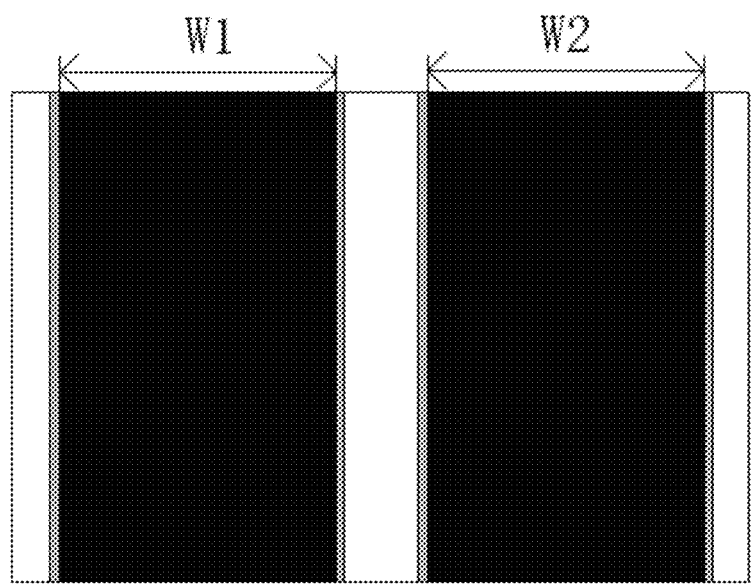
FIG. 4 is a schematic diagram of a 1-into-2 equal-coating-width electrode plate according to an embodiment of this application.

On the basis of the above embodiment, this embodiment of this application is not only applicable to an application scenario in which a single coating region is included on the electrode plate, but also applicable to an application scenario in which two or more coating regions are included on the electrode plate. Using an example in which two coating regions are included on the electrode plate, a first coating region and a second coating region are included on the electrode plate, and the first coating region and the second coating region are disposed in parallel in the length direction of the substrate of the electrode plate. FIG. 4 is a schematic diagram of a 1-into-2 equal-coating-width electrode plate according to an embodiment of this application. As shown in FIG. 4, the coating region on the left is referred to as a first coating region, and the coating region on the right is referred to as a second coating region. If the electrode plate is not dried, W1 is the width of the first wet coating region, and W2 is the width of the second wet coating region.

This embodiment of this application can implement correction for the coating size of the first coating region and the second coating region by performing the following specific operations:

acquiring, by an electronic device, a second wet coating width and a second dry coating width of a second coating region on an electrode plate;

calculating a third deviation between the second dry coating width and a preset coating width as well as a fourth deviation between the second wet coating width and the second dry coating width when the second dry coating width fails to meet a preset width requirement; and determining a second correction amount based on the third deviation and the fourth deviation.

In a specific implementation process, the second wet coating width and the second dry coating width may correspond to the same position of the second coating region. The same position may be understood as being in the same zone in the second coating region. For example, the second wet coating width is an coating size of a zone at the $1^{st}$ meter to the $2^{nd}$ meter in the second coating region. Therefore, the second dry coating width is also the coating size of the zone at the $1^{st}$ meter to the $2^{nd}$ meter in the second coating region. Understandably, the purpose of defining the second wet coating width and the second dry coating width at the same position in this embodiment of this application is to calculate and obtain the change in the width of the same zone changing from a wet state to a dry state in a subsequent step. Definitely, the second wet coating width and the second dry coating width may correspond to not exactly the same position, but slightly deviated positions. For example, the second wet coating width is a coating size of a zone at the $1^{st}$ meter to the $2^{nd}$ meter in the second coating region, and therefore, the second dry coating width is the coating size of the zone at the $1.1^{th}$ meter to the $2.1^{th}$ meter in the second coating region.

Understandably, the method for obtaining the second wet coating width and the second dry coating width is the same as the acquisition method of the first wet coating width and the first dry coating width in the above embodiment, and is omitted here.

Similarly, the method for determining whether the second dry coating width meets the preset width requirement is the same as the method for determining whether the first dry coating width meets the requirement, and is omitted here.

After acquiring the second dry coating width, if the electronic device determines that the second dry coating width fails to meet the preset width requirement, then the electronic device obtains a third deviation between the second dry coating width and the preset coating width, and calculates a fourth deviation between the second wet coating width and the second dry coating width. The third deviation may be obtained by subtracting the preset coating width from the second dry coating width, or obtained by subtracting the second dry coating width from the preset coating width. The fourth deviation may be obtained by subtracting the second dry coating width from the second wet coating width, or obtained by subtracting the second wet coating width from the second dry coating width. It is hereby noted that the specific method for obtaining the third deviation and the fourth deviation will affect the subsequent steps. This embodiment of this application is described by using an example in which the third deviation is obtained by subtracting the preset coating width from the second dry coating width, and in which the fourth deviation is obtained by subtracting the second dry coating width from the second wet coating width.

The second correction amount is used for representing the amount by which the position of the spraying apparatus is adjusted. The second correction amount may be a specific distance by which the spraying apparatus needs to be adjusted, or may be the number of times the position of the spraying apparatus needs to be adjusted. Understandably, the number of times the position of the spraying apparatus needs to be adjusted corresponds to the distance by which the spraying apparatus moves in the thickness direction of the electrode plate. After obtaining the third deviation and the fourth deviation, the electronic device may determine, based on the third deviation and the fourth deviation, the second correction amount by which the position of the spraying apparatus needs to be adjusted.

It is hereby noted that, in this embodiment of this application, the first coating region and the second coating region correspond to different correction amounts respectively. That is, the first coating region corresponds to the first correction amount, and the second coating region corresponds to the second correction amount. Both the first correction amount and the second correction amount are used for correcting the position of the spraying apparatus. Therefore, in order to ensure that the first coating region and the second coating region do not interfere with each other during correction, the two ends of the spraying apparatus may correspond to two coating regions respectively. For example, when the width of the first wet coating needs to be adjusted, the left end of the spraying apparatus may be adjusted; and, when the width of the second wet coating needs to be adjusted, the right end of the spraying apparatus may be adjusted.

This embodiment of this application is applicable to a one-into-two coating process, and implements correction for the dimensions of both the first coating region and the second coating region concurrently, thereby improving the efficiency of deviation correction.

On the basis of the above embodiment, the electronic device may determine the second correction amount based on the third deviation and the fourth deviation by performing the following steps:

determining the second correction amount based on the third deviation when the third deviation indicates that the second dry coating width is greater than the preset coating width, and when the fourth deviation indicates that the second wet coating width is greater than the second dry coating width; and determining the second correction amount based on an absolute value of the third deviation and an absolute value of the fourth deviation when the third deviation indicates that the second dry coating width is greater than the preset coating width, and when the fourth deviation indicates that the second wet coating width is less than the second dry coating width.

In a specific implementation process, if the third deviation is greater than 0, it indicates that the second dry coating width is greater than the preset coating width, and it is preliminarily determined that the second wet coating width needs to be reduced. If the fourth deviation is greater than 0, it indicates that the second wet coating width is greater than the second dry coating width, and thereby indicates that the coating width of the second coating region becomes narrower after transition from a wet state to a dry state. If both the third deviation and the fourth deviation are greater than 0, it indicates that, compared with the second wet coating region, the second dry coating region with a width reduced by drying is still wider than the preset coating width. In this case, the second correction amount may be determined based on the third deviation. Specifically, the third deviation may be used as the second correction amount.

If the fourth deviation is less than 0, it indicates that the second dry coating width is greater than the second wet coating width, and thereby indicates that the coating width of the second coating region becomes wider after transition from a wet state to a dry state. If the third deviation is greater than 0 and the fourth deviation is less than 0, it indicates that, compared with the second wet coating region, the second dry coating region with a width increased by drying is wider than the preset coating width. In this case, it is necessary to determine, based on the absolute value of the third deviation and the absolute value of the fourth deviation, the main factor that causes the second dry coating width to be greater than the preset coating width (whether primarily lies in the width change of the coating region from a wet state to a dry state, or primarily lies in the deviation between the second dry coating width and the preset coating width), and then determine the second correction amount accordingly.

In this embodiment of this application, by comparing the second dry coating width with the preset coating width, it is determined whether the second dry coating width needs to be widened or narrowed. The expansibility or shrinkability of the coating is determined based on the second wet coating width and the second dry coating width, and then the second correction amount is determined accurately based on the above determining result.

On the basis of the above embodiment, when the electronic device determines the second correction amount based on the third deviation and the fourth deviation, the following operations may be performed in the following circumstances:

determining the second correction amount based on the third deviation when the third deviation indicates that the second dry coating width is less than the preset coating width, and when the fourth deviation indicates that the second wet coating width is less than the second dry coating width; and determining the second correction amount based on an absolute value of the third deviation and an absolute value of the fourth deviation when the third deviation indicates that the second dry coating width is less than the preset coating width, and when the fourth deviation indicates that the second wet coating width is greater than the second dry coating width.

In a specific implementation process, if the third deviation is less than 0, it indicates that the second dry coating width is less than the preset coating width, and it is preliminarily determined that the second wet coating width needs to be increased. If the fourth deviation is less than 0, it indicates that the second wet coating width is less than the second dry coating width, and thereby indicates that the coating width of the second coating region becomes wider after transition from a wet state to a dry state. If both the third deviation and the fourth deviation are less than 0, it indicates that, compared with the second wet coating region, the second dry coating region with a width increased by drying is still narrower than the preset coating width. In this case, the second correction amount may be determined based on the third deviation. Specifically, the third deviation may be used as the second correction amount.

If the fourth deviation is greater than 0, it indicates that the second dry coating width is less than the second wet coating width, and thereby indicates that the coating width of the second coating region becomes narrower after transition from a wet state to a dry state. If the third deviation is less than 0 and the fourth deviation is greater than 0, it indicates that, compared with the second wet coating region, the second dry coating region with a width reduced by drying is narrower than the preset coating width. In this case, it is necessary to determine, based on the absolute value of the third deviation and the absolute value of the fourth deviation, the main factor that causes the second dry coating width to be less than the preset coating width (whether primarily lies in the width change of the coating region from a wet state to a dry state, or primarily lies in the deviation between the second dry coating width and the preset coating width), and then determine the second correction amount accordingly.

Understandably, the second correction amount represents a distance by which an end corresponding to the second coating region in the spraying apparatus needs to move.

In this embodiment of this application, by comparing the second dry coating width with the preset coating width, it is determined whether the second dry coating width needs to be widened or narrowed. The expansibility or shrinkability of the coating is determined based on the second wet coating width and the second dry coating width, and then the second correction amount is determined accurately based on the above determining result.

In a specific implementation process, if the absolute value of the third deviation is greater than the absolute value of the fourth deviation, it indicates that the third deviation exerts a greater effect on the coating width. Therefore, the electronic device determines the second correction amount based on the third deviation.

If the absolute value of the third deviation is less than the absolute value of the fourth deviation, it indicates that the fourth deviation exerts a greater effect on the coating width. Therefore, the electronic device determines the second correction amount based on the fourth deviation.

In this embodiment of this application, a main factor for the second dry coating width failing to meet the requirement is determined by calculating the absolute value of the third deviation versus the absolute value of the fourth deviation, and then the second correction amount is determined based on the main factor, thereby improving the accuracy of calculating the second correction amount.

On the basis of the above embodiment, after obtaining the first correction amount and the second correction amount, the method further includes:

controlling, based on the first deviation and the first correction amount, a first end of a spraying apparatus to move along a thickness direction of the electrode plate; and controlling, based on the third deviation and the second correction amount, a second end of the spraying apparatus to move along the thickness direction of the electrode plate.

In the method above, the first end is an end of the spraying apparatus and opposite to the first coating region, and the second end is an end of the spraying apparatus and opposite to the second coating region.

In a specific implementation process, after the electronic device determines the first correction amount, the first correction amount is used for adjusting the first wet coating width of the first coating region. Therefore, still using the 1-into-2 coating region product in FIG. 3 as an example, the coating position at the left edge of the first coating region may be adjusted by adjusting the position of the left end of the spraying apparatus, so as to achieve the purpose of adjusting the first wet coating width. Similarly, the second correction amount is used for adjusting the second wet coating width of the second coating region. Therefore, the coating position at the right edge of the second coating region may be adjusted by adjusting the position of the right end of the spraying apparatus, so as to achieve the purpose of adjusting the second wet coating width.

This embodiment of this application deals with a circumstance in which the wet coating widths of both the first coating region and the second coating region need to be adjusted. In practical applications, it is possible that only the first wet coating width or only the second wet coating width needs to be adjusted. In a case in which only the first wet coating width needs to be adjusted, the electronic device controls, after determining the first correction amount, the first end of the spraying apparatus to move along the thickness direction of the electrode plate. The second end of the spraying apparatus does not need to be adjusted. In a case in which only the second wet coating width needs to be adjusted, the electronic device controls, after determining the second correction amount, the second end of the spraying apparatus to move along the thickness direction of the electrode plate. The first end of the spraying apparatus does not need to be adjusted.

In this embodiment of this application, the distances by which the two ends of the spraying apparatus move along the thickness direction of the electrode plate can be adjusted based on the first correction amount and the second correction amount respectively, thereby implementing adjustment of the size of a single coating region among a plurality of coating regions in the electrode plate.

On the basis of the above embodiment, the second wet coating width and the second dry coating width of the second coating region at the same position on an electrode plate may be acquired by:

acquiring a second wet coating image and a second dry coating image of the second coating region on the electrode plate by use of an image acquisition apparatus; and determining, based on a device parameter of the image acquisition apparatus, the second wet coating width corresponding to the second wet coating image and the second dry coating width corresponding to the second dry coating image.

In a specific implementation process, the image acquisition apparatus may be an apparatus configured to acquire an image and mounted on the electronic device, or may be an external apparatus configured to acquire an image, such as a CCD camera. If the image acquisition apparatus is an external apparatus, the image acquisition apparatus is communicatively connected to the electronic device, and sends the acquired second wet coating image and second dry coating image to the electronic device.

Depending on the type of the image acquisition apparatus, the device parameters vary. Correspondingly, after the image acquisition apparatus acquires an image, the actual width corresponding to each pixel in the image varies. Definitely, when the image acquisition apparatus acquires an image, the distance between the image acquisition apparatus and the target object also affects the actual width corresponding to one pixel. To accurately obtain the second wet coating width and the second dry coating width, this embodiment of this application may pre-calibrate the image acquisition apparatus. To be specific, the image acquisition apparatus performs image acquisition on an object of a known size in advance, so as to calibrate the actual width corresponding to a previous pixel in the acquired image. Subsequently, under the same working conditions, image acquisition is performed on the second coating region.

After obtaining the second wet coating image and the second dry coating image, the electronic device can determine the actual length corresponding to one pixel based on the device parameters of the image acquisition apparatus, and then obtain the second wet coating width based on the number of pixels occupied by the second wet coating region in the second wet coating image in the width direction, and obtain the second dry coating width based on the number of pixels occupied by the second dry coating region in the second dry coating image in the width direction.

For a 1-into 2 equal-coating-width product, during the image acquisition, one image acquisition apparatus may implement acquisition of the first wet coating image and the second wet coating image, and another image acquisition apparatus may implement acquisition of the first dry coating image and the second dry coating image. Definitely, the image of the first coating region and the image of the second coating region may be acquired by different image acquisition apparatuses respectively. Specifically, the number of the image acquisition apparatuses may be selected depending on the actual situation, and is not particularly limited herein.

In this embodiment of this application, the second wet coating width and the second dry coating width can be determined efficiently and accurately by using vision technology.

On the basis of the above embodiment, the second wet coating width and the second dry coating width of the second coating region on the electrode plate may be obtained by the following method:

obtaining a second wet coating of a third preset length in the second coating region on the electrode plate, and using an average width of the second wet coating of the third preset length as the second wet coating width; and obtaining a second dry coating of a fourth preset length in the second coating region on the electrode plate, and using an average width of the second dry coating of the fourth preset length as the second dry coating width.

In a specific implementation process, during the coating, the second wet coating width may be abruptly widened or narrowed in a short time due to the unstable operation of the coating machine, but at other times, the second wet coating width and the second dry coating width are stable and fall within the required normal width range. If only the abruptly changed second wet coating width and second dry coating width are acquired, the second wet coating width and the second dry coating width cannot be reflected accurately, and in turn, the second dry coating width that meets the requirements cannot be obtained by correcting the second wet coating width accurately.

To solve the above problem, the electronic device in an embodiment of this application uses an average width of the second wet coating of the third preset length as the second wet coating width and uses an average width of the second dry coating of the fourth preset length as the second dry coating width. The preset length is set in advance. For example, the preset length may be 5 meters, 10 meters, 20 meters, or the like. The preset length is not particularly limited in this embodiment of this application. Understandably, the third preset length and the fourth preset length may be the same or different.

Using an example in which the second wet coating width and the second dry coating width correspond to the second coating region at the same position, during calculation of the average width of the second wet coating, measurement points may be set at intervals on the second wet coating, and the widths at the measurement points are measured. The widths of a plurality of measurement points may be obtained on the second wet coating, and summed and averaged out to obtain the second wet coating width.

Similarly, during calculation of the average width of the second dry coating, a position corresponding to the measurement point on the second wet coating and located on the second dry coating may be used as a measurement point, and the width at this measurement point is measured. The widths of a plurality of measurement points may be obtained on the second dry coating, and summed and averaged out to obtain the second dry coating width.

Understandably, the length of each preset interval is less than the third preset length and the fourth preset length.

In this embodiment of this application, an average width across a coating length in the coating region is adopted so as to more accurately reflect the second wet coating width and the second dry coating width.

Figure 5:
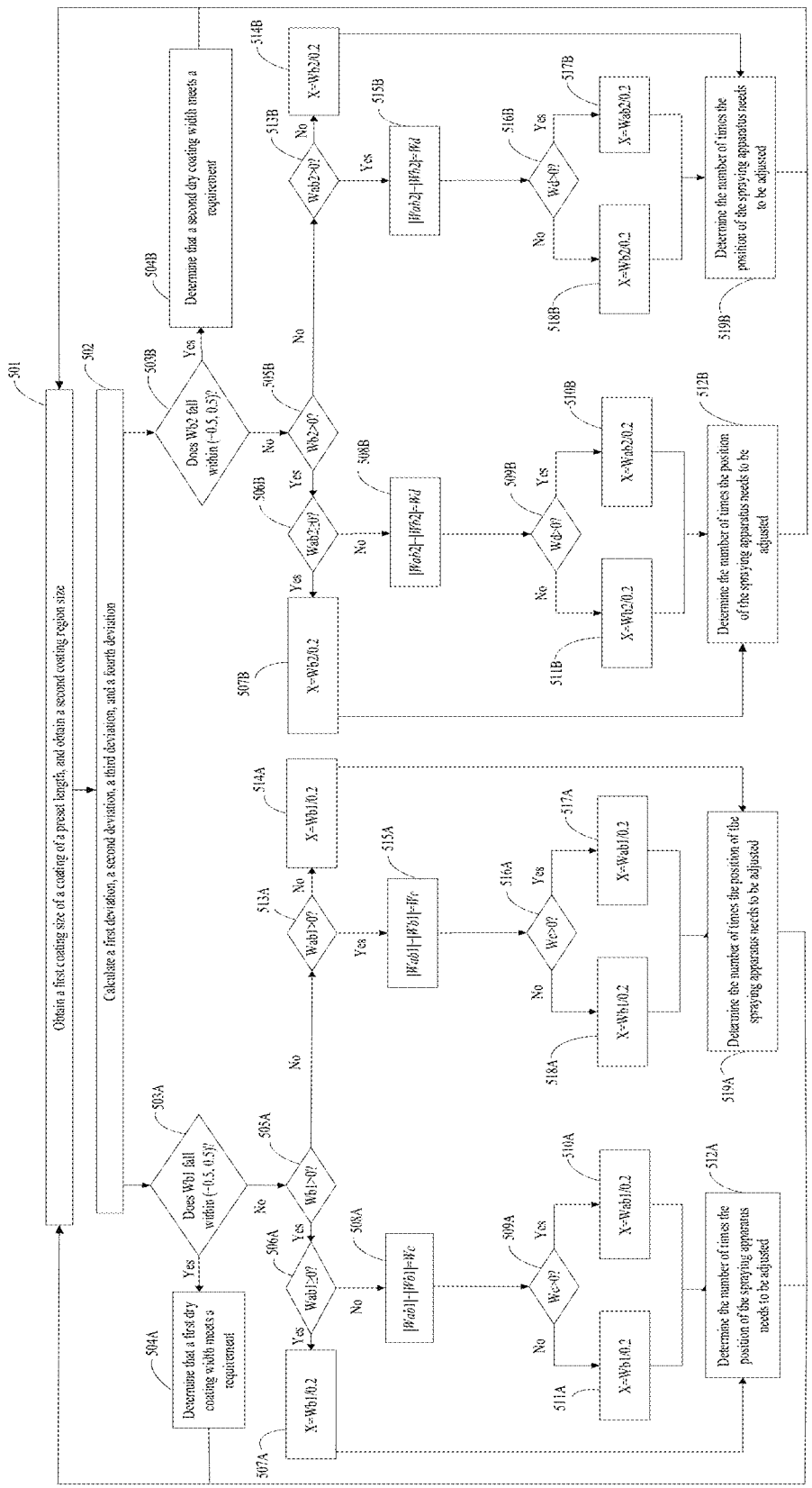
FIG. 5 is a schematic flowchart of another coating size correction method according to an embodiment of this application.

FIG. 5 is a schematic flowchart of another coating size correction method according to an embodiment of this application. As shown in FIG. 5, using the production process of a 1-into-2 equal-coating-width product as an example, the method includes the following steps:

Step 501: Obtain a first coating size of a coating of a preset length, and obtain a second coating region size. The first coating size includes an average value A1 of a first wet coating width W1 and an average value B1 of a first dry coating width W1'. The second coating region size includes an average value A2 of a second wet coating width W2 and an average value B2 of a second dry coating width W2'.

Step 502: Calculate a first deviation, a second deviation, a third deviation, and a fourth deviation, where the first deviation is Wb1=B1−M, the second deviation is Wb2=B2−M, the third deviation Wab1=A1−B1, and the fourth deviation is Wab2=A2−B2, where M is a preset coating width.

Next, step 503A to step 519A are performed for the first coating region, and step 503B to step 519B are performed for the second coating region. It is hereby noted that step 503A to step 519A and step 503B to step 519B are not order-sensitive.

Step 503A: Determine whether the first deviation Wb1 falls within the range (−0.5, 0.5); if the first deviation falls within the range, go to step 504A; or, if the first deviation falls outside the range, go to step 505A.

Step 504A: Determine that the first dry coating width meets the requirement, and go back to repeat step 501.

Step 505A: Determine whether the first deviation Wb1 is greater than 0; if the first deviation is greater than 0, go to step 506A; or, if the first deviation is less than or equal to 0, go to step 513A.

Step 506A: Determine whether the third deviation Wab1 is greater than or equal to 0; if the third deviation is greater than or equal to 0, go to step 507A; or, if the third deviation is less than 0, go to step 508A.

Step 507A: Determine the number of times the position of the spraying apparatus needs to be adjusted, and calculate the number of times according to X=|Wb1|/0.2, rounded down to obtain X, where X is the number of times the position of the spraying apparatus needs to be adjusted. Next, go to step 512A.

Step 508A: If the third deviation Wab1 is less than 0, calculate |Wab1|−|Wb1|=Wc.

Step 509A: Determine whether Wc is greater than 0; if Wc is greater than 0, go to step 510A; or, if Wc is less than or equal to 0, go to step 511A.

Step 510A: Determine the number of times the position of the spraying apparatus needs to be adjusted, and calculate the number of times according to X=|Wab1|/0.2, rounded down to obtain X, where X is the number of times the position of the spraying apparatus needs to be adjusted. Next, go to step 512A.

Step 511A: Determine the number of times the position of the spraying apparatus needs to be adjusted, and calculate the number of times according to X=|Wb1|/0.2, rounded down to obtain X, where X is the number of times the position of the spraying apparatus needs to be adjusted. Next, go to step 512A.

Step 512A: Adjust the position of the spraying apparatus for X times by moving the left end of the spraying apparatus away from the electrode plate along the thickness direction of the electrode plate.

Step 513A: Determine whether the third deviation Wab1 is greater than 0; if the third deviation is not greater than 0, go to step 514A; or, if the third deviation is greater than 0, go to step 515A.

Step 514A: Determine the number of times the position of the spraying apparatus needs to be adjusted, and calculate the number of times according to X=|Wb1|/0.2, rounded down to obtain X, where X is the number of times the position of the spraying apparatus needs to be adjusted. Next, go to step 519A.

Step 515A: If the third deviation Wab1 is less than or equal to 0, calculate |Wab1|−|Wb1|=Wc.

Step 516A: Determine whether Wc is greater than 0; if Wc is greater than 0, go to step 517A; or, if Wc is less than or equal to 0, go to step 518A.

Step 517A: Determine the number of times the position of the spraying apparatus needs to be adjusted, and calculate the number of times according to X=|Wab1|/0.2, rounded down to obtain X, where X is the number of times the position of the spraying apparatus needs to be adjusted. Next, go to step 519A.

Step 518A: Determine the number of times the position of the spraying apparatus needs to be adjusted, and calculate the number of times according to X=|Wb1|/0.2, rounded down to obtain X, where X is the number of times the position of the spraying apparatus needs to be adjusted. Next, go to step 519A.

Step 519A: Move the left end of the spraying apparatus toward the electrode plate along the thickness direction of the electrode plate for X times.

Step 503B: Determine whether the second deviation Wb2 falls within the range (−0.5, 0.5); if the second deviation falls within the range, go to step 504B; or, if the second deviation falls outside the range, go to step 505B.

Step 504B: Determine that the second dry coating width meets the requirement, and go back to repeat step 501.

Step 505B: Determine whether the second deviation Wb2 is greater than 0; if the second deviation is greater than 0, go to step 506B; or, if the second deviation is less than or equal to 0, go to step 513B.

Step 506B: Determine whether the fourth deviation Wab2 is greater than or equal to 0; if the fourth deviation is greater than or equal to 0, go to step 507B; or, if the fourth deviation is less than 0, go to step 508B.

Step 507B: Determine the number of times the position of the spraying apparatus needs to be adjusted, and calculate the number of times according to X=|Wb2|/0.2, rounded down to obtain X, where X is the number of times the position of the spraying apparatus needs to be adjusted. Next, go to step 512B.

Step 508B: If the fourth deviation Wab2 is less than 0, calculate |Wab2|−|Wb2|=Wd.

Step 509B: Determine whether Wd is greater than 0; if Wd is greater than 0, go to step 510B; or, if Wd is less than or equal to 0, go to step 511B.

Step 510B: Determine the number of times the position of the spraying apparatus needs to be adjusted, and calculate the number of times according to X=|Wab2|/0.2, rounded down to obtain X, where X is the number of times the position of the spraying apparatus needs to be adjusted. Next, go to step 512B.

Step 511B: Determine the number of times the position of the spraying apparatus needs to be adjusted, and calculate the number of times according to X=|Wb2|/0.2, rounded down to obtain X, where X is the number of times the position of the spraying apparatus needs to be adjusted. Next, go to step 512B.

Step 512B: Move the right end of the spraying apparatus away from the electrode plate along the thickness direction of the electrode plate for X times.

Step 513B: Determine whether the fourth deviation Wab2 is greater than 0; if the fourth deviation is less than or equal to 0, go to step 514B; or, if the fourth deviation is greater than 0, go to step 515B.

Step 514B: Determine the number of times the position of the spraying apparatus needs to be adjusted, and calculate the number of times according to X=|Wb2|/0.2, rounded down to obtain X, where X is the number of times the position of the spraying apparatus needs to be adjusted. Next, go to step 519B.

Step 515B: If the fourth deviation Wab2 is less than or equal to 0, calculate |Wab2|−|Wb2|=Wd.

Step 516B: Determine whether Wd is greater than 0; if Wd is greater than 0, go to step 517B; or, if Wd is less than or equal to 0, go to step 518B.

Step 517B: Determine the number of times the position of the spraying apparatus needs to be adjusted, and calculate the number of times according to X=|Wab2|/0.2, rounded down to obtain X, where X is the number of times the position of the spraying apparatus needs to be adjusted. Next, go to step 519B.

Step 518B: Determine the number of times the position of the spraying apparatus needs to be adjusted, and calculate the number of times according to X=|Wb2|/0.2, rounded down to obtain X, where X is the number of times the position of the spraying apparatus needs to be adjusted. Next, go to step 519B.

Step 519B: Move the right end of the spraying apparatus toward the electrode plate along the thickness direction of the electrode plate for X times.

Figure 6:
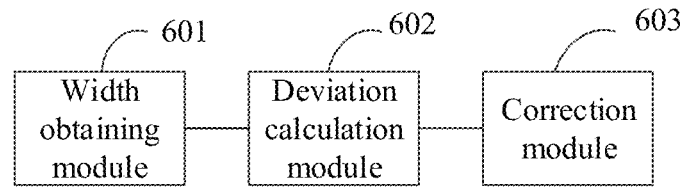
FIG. 6 is a schematic structural diagram of a coating size correction apparatus according to an embodiment of this application.

FIG. 6 is a schematic structural diagram of a coating size correction apparatus according to an embodiment of this application. The apparatus may be a module, a program segment, or code on an electronic device. Understandably, the device corresponds to the method embodiment shown in FIG. 1, and can implement the steps specified in the method embodiment shown in FIG. 1. Specific functions of the device may be learned by referring to the foregoing description, and the detailed description is duly omitted here to avoid repetition. The apparatus includes: a width obtaining module 601, a deviation calculation module 602, and a correction module 603.

The width obtaining module 601 is configured to acquire a first wet coating width and a first dry coating width of a first coating region on an electrode plate.

The deviation calculation module 602 is configured to obtain a first deviation between the first dry coating width and a preset coating width, and a second deviation between the first wet coating width and the first dry coating width.

The correction module 603 is configured to determine a first correction amount based on the first deviation and the second deviation.

On the basis of the foregoing embodiment, the correction module 603 is specifically configured to:

obtain the first deviation between the first dry coating width and the preset coating width as well as the second deviation between the first wet coating width and the first dry coating width when the first dry coating width fails to meet a preset requirement.

On the basis of the foregoing embodiment, the correction module 603 is specifically configured to:
  determine the first correction amount based on the first deviation when the first deviation indicates that the first dry coating width is greater than the preset coating width, and when the second deviation indicates that the first wet coating width is greater than the first dry coating width; and
  determine the first correction amount based on an absolute value of the first deviation and an absolute value of the second deviation when the first deviation indicates that the first dry coating width is greater than the preset coating width, and when the second deviation indicates that the first wet coating width is less than the first dry coating width.

On the basis of the foregoing embodiment, the correction module 603 is specifically configured to:
  determine the first correction amount based on the first deviation when the first deviation indicates that the first dry coating width is less than the preset coating width, and when the second deviation indicates that the first wet coating width is less than the first dry coating width; and
  determine the first correction amount based on an absolute value of the first deviation and an absolute value of the second deviation when the first deviation indicates that the first dry coating width is less than the preset coating width, and when the second deviation indicates that the first wet coating width is greater than the first dry coating width.

On the basis of the foregoing embodiment, the correction module 603 is specifically configured to:
  determine the first correction amount based on the first deviation when a difference between the absolute value of the first deviation and the absolute value of the second deviation is greater than zero; or
  determine the first correction amount based on the second deviation when a difference between the absolute value of the first deviation and the absolute value of the second deviation is less than zero.

On the basis of the above embodiment, the apparatus further includes a first adjustment module, configured to:
  control, based on the first correction amount when the first dry coating width is greater than the preset coating width, a spraying apparatus to move away from the electrode plate along a thickness direction of the electrode plate; or
  control, based on the first correction amount when the first dry coating width is less than the preset coating width, a spraying apparatus to move toward the electrode plate along a thickness direction of the electrode plate.

On the basis of the above embodiment, the width obtaining module 601 is specifically configured to:
  acquire a first wet coating image and a first dry coating image of the first coating region on the electrode plate by use of an image acquisition apparatus; and
  determine, based on a device parameter of the image acquisition apparatus, the first wet coating width corresponding to the first wet coating image and the first dry coating width corresponding to the first dry coating image.

On the basis of the above embodiment, the width obtaining module 601 is specifically configured to:
  obtain a first wet coating of a first preset length in the first coating region on the electrode plate, and using an average width of the first wet coating of the first preset length as the first wet coating width; and
  obtain a first dry coating of a second preset length on the electrode plate, and using an average width of the first dry coating of the second preset length as the first dry coating width.

On the basis of the above embodiment, the width obtaining module 601 is further configured to: acquire a second wet coating width and a second dry coating width of a second coating region on the electrode plate, where the second coating region and the first coating region are arranged in parallel in a length direction of the electrode plate.

The deviation calculation module 602 is further configured to: calculate a third deviation between the second dry coating width and a preset coating width as well as a fourth deviation between the second wet coating width and the second dry coating width when the second dry coating width fails to meet a preset width requirement.

The correction module 603 is further configured to: determine a second correction amount based on the third deviation and the fourth deviation.

On the basis of the foregoing embodiment, the correction module 603 is further specifically configured to:
  determine the second correction amount based on the third deviation when the third deviation indicates that the second dry coating width is greater than the preset coating width, and when the fourth deviation indicates that the second wet coating width is greater than the second dry coating width; and
  determine the second correction amount based on an absolute value of the third deviation and an absolute value of the fourth deviation when the third deviation indicates that the second dry coating width is greater than the preset coating width, and when the fourth deviation indicates that the second wet coating width is less than the second dry coating width.

On the basis of the foregoing embodiment, the correction module 603 is further specifically configured to:
  determine the second correction amount based on the third deviation when the third deviation indicates that the second dry coating width is less than the preset coating width, and when the fourth deviation indicates that the second wet coating width is less than the second dry coating width; and
  determine the second correction amount based on an absolute value of the third deviation and an absolute value of the fourth deviation when the third deviation indicates that the second dry coating width is less than the preset coating width, and when the fourth deviation indicates that the second wet coating width is greater than the second dry coating width.

On the basis of the foregoing embodiment, the correction module 603 is further specifically configured to:
  determine the second correction amount based on the third deviation when a difference between the absolute value of the third deviation and the absolute value of the fourth deviation is greater than zero; or
  determine the second correction amount based on the fourth deviation when a difference between the absolute value of the third deviation and the absolute value of the fourth deviation is less than zero.

On the basis of the above embodiment, the apparatus further includes a second adjustment module, configured to:
control, based on the first deviation and the first correction amount, a first end of a spraying apparatus to move along a thickness direction of the electrode plate; and
control, based on the third deviation and the second correction amount, a second end of the spraying apparatus to move along the thickness direction of the electrode plate.

The first end is an end of the spraying apparatus and opposite to the first coating region, and the second end is an end of the spraying apparatus and opposite to the second coating region.

On the basis of the above embodiment, the width obtaining module 601 is further specifically configured to:
acquire a second wet coating image and a second dry coating image of the second coating region on the electrode plate by use of an image acquisition apparatus; and
determine, based on a device parameter of the image acquisition apparatus, the second wet coating width corresponding to the second wet coating image and the second dry coating width corresponding to the second dry coating image.

On the basis of the above embodiment, the width obtaining module 601 is further specifically configured to:
obtain a second wet coating of a third preset length in the second coating region on the electrode plate, and use an average width of the second wet coating of the third preset length as the second wet coating width; and
obtain a second dry coating of a fourth preset length in the second coating region on the electrode plate, and use an average width of the second dry coating of the fourth preset length as the second dry coating width.

Figure 7:
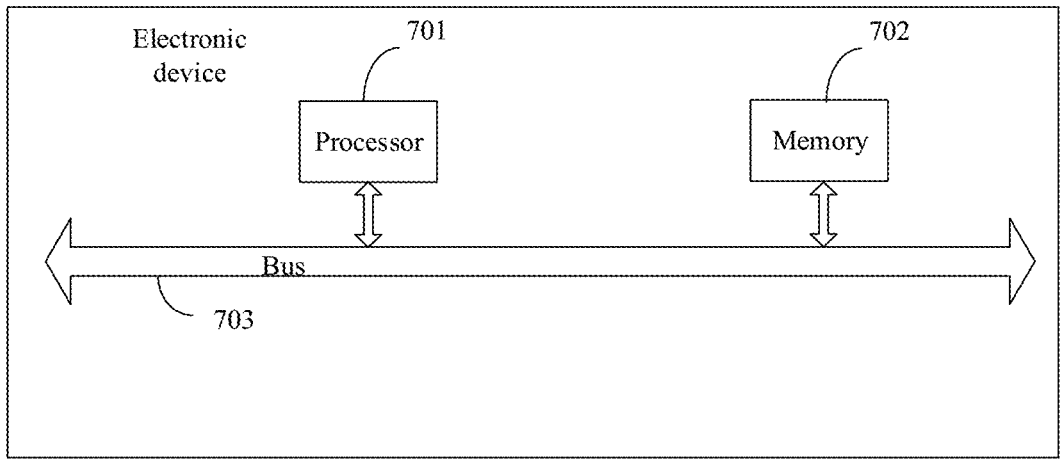
FIG. 7 is a schematic diagram of a physical structure of an electronic device according to an embodiment of this application.

FIG. 7 is a schematic diagram of a physical structure of an electronic device according to an embodiment of this application. As shown in FIG. 7, the electronic device includes: a processor 701, a memory 702, and a bus 703.

The processor 701 communicates with the memory 702 through the bus 703.

The processor 701 is configured to call a program instruction in the memory 702 to perform the method disclosed in each of the foregoing method embodiments. For example, the method includes: acquiring a first wet coating width and a first dry coating width of a first coating region on an electrode plate; obtaining a first deviation between the first dry coating width and a preset coating width, and a second deviation between the first wet coating width and the first dry coating width; and determining a first correction amount based on the first deviation and the second deviation.

The processor 701 may be an integrated circuit chip capable of processing signals. The processor 701 may be a general-purpose processor, such as a central processing unit (CPU) or a network processor (NP); and may be a digital signal processor (DSP), an application-specific integrated circuit (ASIC), a field programmable gate array (FPGA) or another programmable logical device, a discrete gate or a transistor logical device, or a discrete hardware component. The processor can implement or perform various methods, steps, and logical block diagrams disclosed in an embodiment of this application. The general-purpose processor may be a microprocessor, or the processor may be any conventional processor or the like.

The memory 702 may be, but is not limited to, a random access memory (RAM), a read-only memory (ROM), a programmable read-only memory (PROM), an erasable programmable read-only memory (EPROM), an electric erasable programmable read-only memory (EEPROM), or the like.

An embodiment of this application discloses a computer program product. The computer program product includes a computer program stored in a non-transitory computer-readable storage medium. The computer program includes a program instruction. When the program instruction is executed by a computer, the computer can perform the method disclosed in each of the foregoing method embodiments. For example, the method includes: acquiring a first wet coating width and a first dry coating width of a first coating region on an electrode plate; obtaining a first deviation between the first dry coating width and a preset coating width, and a second deviation between the first wet coating width and the first dry coating width; and determining a first correction amount based on the first deviation and the second deviation.

An embodiment of this application provides a non-transitory computer-readable storage medium. The non-transitory computer-readable storage medium stores a computer instruction. The computer instruction causes the computer to perform the method disclosed in each of the foregoing method embodiments. For example, the method includes: acquiring a first wet coating width and a first dry coating width of a first coating region on an electrode plate; obtaining a first deviation between the first dry coating width and a preset coating width, and a second deviation between the first wet coating width and the first dry coating width; and determining a first correction amount based on the first deviation and the second deviation.

Figure 8:
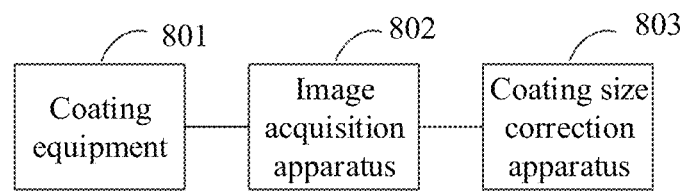
FIG. 8 is a schematic structural diagram of a coating size correction system according to an embodiment of this application.

FIG. 8 is a schematic structural diagram of a coating size correction system according to an embodiment of this application. As shown in FIG. 8, the system includes: an image acquisition apparatus 802 and a coating size correction apparatus 803.

The image acquisition apparatus 802 is communicatively connected to the coating size correction apparatus 803, and is configured to acquire image data of an electrode plate coated by a piece of coating equipment 801, and send the image data to the coating size correction apparatus 803; and The coating size correction apparatus 803 is configured to perform, based on image data, the method disclosed in each of the foregoing embodiments, so as to correct the coating size and ensure accuracy of the coating size.

Figure 9:
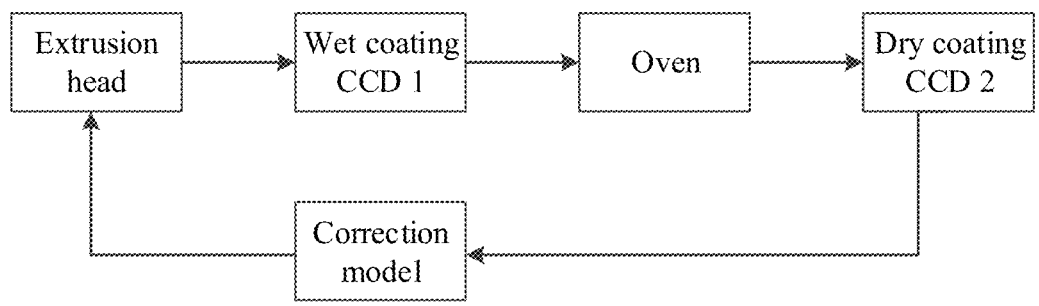
FIG. 9 is a working principle diagram of a coating size correction system according to an embodiment of this application.

FIG. 9 is a working principle diagram of a coating size correction system according to an embodiment of this application. As shown in FIG. 9, first, slurry is sprayed onto a current collector by a spraying apparatus to form a wet coating region. A wet coating CCD 1 acquires a wet coating image, and sends the wet coating image to a correction model. The wet coating region is dried by an oven. A dry coating CCD 2 acquires an image of the dry coating region that is moved out of the oven, so as to obtain a dry coating image, and sends the dry coating image to the correction model. Understandably, the correction model is disposed in the coating size correction apparatus. Based on the wet coating image and the dry coating image, the correction model determines a correction amount, and controls the spraying apparatus to move by the correction amount.

In this embodiment of this application, the first correction amount for correcting the deviation is determined based on the first wet coating width and first dry coating width acquired by the correction apparatus and based on the preset coating width, thereby improving efficiency and accuracy of coating size correction.

On the basis of the above embodiment, the image acquisition apparatus includes a first image acquirer, a second image acquirer, a third image acquirer, and a fourth image acquirer. The first image acquirer is disposed on a first side of an oven in the coating equipment, oriented directly toward a first surface of the electrode plate, and configured to acquire a wet coating image of the first surface. The second image acquirer is disposed on a second side of the oven, oriented directly toward the first surface of the electrode plate, and configured to acquire a dry coating image of the first surface. The third image acquirer is disposed on a second side of the oven in the coating equipment, oriented directly toward a second surface of the electrode plate, and configured to acquire a wet coating image of the second surface. The fourth image acquirer is disposed on the first side of the oven, oriented directly toward the second surface of the electrode plate, and configured to acquire a dry coating image of the second surface.

In a specific implementation process, referring to the schematic diagram of the coating machine measurement and spraying apparatus control system shown in FIG. 3 above, the serial number 4 in FIG. 3 is a first image acquirer, the serial number 6 is a second image acquirer, the serial number 12 is a third image acquirer, and the serial number 13 is a fourth image acquirer.

In an embodiment provided in this application, it is understandable that the disclosed apparatus and method may be implemented by other means. The described apparatus embodiment is merely illustrative. For example, the division of the apparatus into several units is merely a type of logic function division, and the apparatus may be divided in other manners in practical implementations. For another example, a plurality of units or components may be combined or integrated into another system, or some features may be ignored or skipped. In addition, a mutual coupling or direct coupling or communication connection illustrated or discussed herein may be an indirect coupling or communication connection implemented through some communication interfaces, apparatuses, or units, and may be in electrical, mechanical or other forms.

In addition, the units described as discrete components above may be separated physically or not; and the components illustrated as units may be physical units or not, that is, they may be located in one place or distributed on a plurality of network elements. Some or all of the units may be selected according to actual needs to achieve the objectives of a technical solution in an embodiment of this application.

In addition, function modules in each embodiment of this application may be integrated together to form a stand-alone part, or each module may exist alone, or two or more modules may be integrated into a stand-alone part.

The relational terms herein such as first and second are used merely to differentiate one entity or operation from another, and do not necessarily require or imply any actual relationship or sequence between the entities or operations.

What is described above is merely embodiments of this application, but not intended to limit the protection scope of this application. To a person skilled in the art, various modifications and variations may be made to this application. Any and all modifications, equivalent replacements, improvements, and the like made without departing from the spirit and principles of this application still fall within the protection scope of this application.

What is claimed is:

1. A method for correcting a coating size of an electrode plate, performed by a coating size correction system that comprises an image acquisition apparatus and a coating size correction apparatus, the method comprising:
   acquiring, by the image acquisition apparatus, a first wet coating width and a first dry coating width of a first coating region on the electrode plate;
   obtaining, by the coating size correction apparatus, a first deviation between the first dry coating width and a preset coating width, and a second deviation between the first wet coating width and the first dry coating width;
   determining by the coating size correction apparatus, whether the first deviation meets a preset requirement, wherein the preset requirement is that the first deviation is within a predetermined range; and
   when the first deviation fails to meet the preset requirement determining, by the coating size correction apparatus, a first correction amount based on the first deviation and the second deviation;
   wherein a distance between a spraying apparatus and the electrode plate is adjusted according to the determined first correction amount.

2. The method according to claim 1, wherein the determining a first correction amount based on the first deviation and the second deviation comprises:
   determining the first correction amount based on the first deviation when the first deviation indicates that the first dry coating width is greater than the preset coating width, and when the second deviation indicates that the first wet coating width is greater than the first dry coating width; and
   determining the first correction amount based on an absolute value of the first deviation and an absolute value of the second deviation when the first deviation indicates that the first dry coating width is greater than the preset coating width, and when the second deviation indicates that the first wet coating width is less than the first dry coating width.

3. The method according to claim 1, wherein the determining a first correction amount based on the first deviation and the second deviation comprises:
   determining the first correction amount based on the first deviation when the first deviation indicates that the first dry coating width is less than the preset coating width, and when the second deviation indicates that the first wet coating width is less than the first dry coating width; and
   determining the first correction amount based on an absolute value of the first deviation and an absolute value of the second deviation when the first deviation indicates that the first dry coating width is less than the preset coating width, and when the second deviation indicates that the first wet coating width is greater than the first dry coating width.

4. The method according to claim 2, wherein the determining the first correction amount based on an absolute value of the first deviation and an absolute value of the second deviation comprises:
   determining the first correction amount based on the first deviation when a difference between the absolute value of the first deviation and the absolute value of the second deviation is greater than zero; or
   determining the first correction amount based on the second deviation when a difference between the absolute value of the first deviation and the absolute value of the second deviation is less than zero.

5. The method according to claim 1, wherein after determining the first correction amount, the method further comprises:
- controlling, by the coating size correction apparatus based on the first correction amount when the first dry coating width is greater than the preset coating width, the spraying apparatus to move away from the electrode plate along a thickness direction of the electrode plate; or
- controlling, by the coating size correction apparatus based on the first correction amount when the first dry coating width is less than the preset coating width, the spraying apparatus to move toward the electrode plate along a thickness direction of the electrode plate.

6. The method according to claim 1, wherein the acquiring a first wet coating width and a first dry coating width of a first coating region on an electrode plate comprises:
- acquiring a first wet coating image and a first dry coating image of the first coating region on the electrode plate; and
- determining, based on a device parameter of the image acquisition apparatus, the first wet coating width corresponding to the first wet coating image and the first dry coating width corresponding to the first dry coating image.

7. The method according to claim 1, wherein the acquiring a first wet coating width and a first dry coating width of a first coating region on an electrode plate comprises:
- obtaining a first wet coating of a first preset length in the first coating region on the electrode plate, and using an average width of the first wet coating of the first preset length as the first wet coating width; and
- obtaining a first dry coating of a second preset length on the electrode plate, and using an average width of the first dry coating of the second preset length as the first dry coating width.

8. The method according to claim 1, wherein the method further comprises:
- acquiring, by the image acquisition apparatus, a second wet coating width and a second dry coating width of a second coating region on the electrode plate, wherein the second coating region and the first coating region are arranged in parallel in a length direction of the electrode plate;
- calculating by the coating size correction apparatus, a third deviation between the second dry coating width and a preset coating width, and a fourth deviation between the second wet coating width and the second dry coating width when the second dry coating width fails to meet a preset width requirement; and
- determining, by the coating size correction apparatus, a second correction amount based on the third deviation and the fourth deviation.

9. The method according to claim 8, wherein the determining a second correction amount based on the third deviation and the fourth deviation comprises:
- determining the second correction amount based on the third deviation when the third deviation indicates that the second dry coating width is greater than the preset coating width, and when the fourth deviation indicates that the second wet coating width is greater than the second dry coating width; and
- determining the second correction amount based on an absolute value of the third deviation and an absolute value of the fourth deviation when the third deviation indicates that the second dry coating width is greater than the preset coating width, and when the fourth deviation indicates that the second wet coating width is less than the second dry coating width.

10. The method according to claim 8, wherein the determining a second correction amount based on the third deviation and the fourth deviation comprises:
- determining the second correction amount based on the third deviation when the third deviation indicates that the second dry coating width is less than the preset coating width, and when the fourth deviation indicates that the second wet coating width is less than the second dry coating width; and
- determining the second correction amount based on an absolute value of the third deviation and an absolute value of the fourth deviation when the third deviation indicates that the second dry coating width is less than the preset coating width, and when the fourth deviation indicates that the second wet coating width is greater than the second dry coating width.

11. The method according to claim 9, wherein the determining the second correction amount based on an absolute value of the third deviation and an absolute value of the fourth deviation comprises:
- determining the second correction amount based on the third deviation when a difference between the absolute value of the third deviation and the absolute value of the fourth deviation is greater than zero; or
- determining the second correction amount based on the fourth deviation when a difference between the absolute value of the third deviation and the absolute value of the fourth deviation is less than zero.

12. The method according to claim 8, wherein after obtaining the first correction amount and the second correction amount, the method further comprises:
- controlling, by the coating size correction apparatus based on the first deviation and the first correction amount, a first end of the spraying apparatus to move along a thickness direction of the electrode plate; and
- controlling, by the coating size correction apparatus based on the third deviation and the second correction amount, a second end of the spraying apparatus to move along the thickness direction of the electrode plate,
- wherein the first end is an end of the spraying apparatus and opposite to the first coating region, and the second end is an end of the spraying apparatus and opposite to the second coating region.

13. The method according to claim 8, wherein the acquiring a second wet coating width and a second dry coating width of a second coating region on an electrode plate comprises:
- acquiring a second wet coating image and a second dry coating image of the second coating region on the electrode plate; and
- determining, based on a device parameter of the image acquisition apparatus, the second wet coating width corresponding to the second wet coating image and the second dry coating width corresponding to the second dry coating image.

14. The method according to claim 8, wherein the acquiring a second wet coating width and a second dry coating width of a second coating region on an electrode plate comprises:
- obtaining a second wet coating of a third preset length in the second coating region on the electrode plate, and using an average width of the second wet coating of the third preset length as the second wet coating width; and obtaining a second dry coating of a fourth preset length in the second coating region on the electrode plate, and using an average width of the second dry coating of the fourth preset length as the second dry coating width.

15. An electronic device comprising: a processor, a memory, and a bus, wherein
the processor communicates with the memory through the bus; and
the memory stores a program instruction executable by the processor, and the processor calls the program instruction to perform the method according to claim 1.

16. A coating size correction system, comprising:
an image acquisition apparatus; and
a coating size correction apparatus, wherein
the image acquisition apparatus is communicatively connected to the coating size correction apparatus; and
wherein the coating size correction system is configured to perform the method according to claim 1.

17. The coating size correction system according to claim 16, wherein
the image acquisition apparatus comprises a first image acquirer, a second image acquirer, a third image acquirer, and a fourth image acquirer;
the first image acquirer is disposed on a first side of an oven in the coating equipment, oriented directly toward a first surface of the electrode plate, and configured to acquire a wet coating image of the first surface;
the second image acquirer is disposed on a second side of the oven, oriented directly toward the first surface of the electrode plate, and configured to acquire a dry coating image of the first surface;
the third image acquirer is disposed on a second side of the oven in the coating equipment, oriented directly toward a second surface of the electrode plate, and configured to acquire a wet coating image of the second surface; and
the fourth image acquirer is disposed on the first side of the oven, oriented directly toward the second surface of the electrode plate, and configured to acquire a dry coating image of the second surface.

18. A non-transitory computer-readable storage medium, storing program instructions for use by a coating size correction system to perform the method according to claim 1.

* * * * *